United States Patent [19]
Kotzin et al.

[11] Patent Number: 5,081,641
[45] Date of Patent: Jan. 14, 1992

[54] INTERCONNECTING AND PROCESSING SYSTEM FOR FACILITATING FREQUENCY HOPPING

[75] Inventors: Michael D. Kotzin, Buffalo Grove; Stephen L. Spear, Skokie, both of Ill.

[73] Assignee: Motorola, Inc., Schaumburg, Ill.

[21] Appl. No.: 475,633

[22] Filed: Feb. 6, 1990

[51] Int. Cl.⁵ .............................................. H04L 27/30
[52] U.S. Cl. .......................................... 375/1; 370/60; 370/85.1; 370/94.1; 379/59; 455/33; 455/54
[58] Field of Search ................... 379/59; 370/60, 94.1, 370/85.1, 124; 455/33, 54

[56] References Cited
U.S. PATENT DOCUMENTS

| | | | |
|---|---|---|---|
| 4,187,398 | 2/1980 | Stark | 379/59 |
| 4,887,265 | 12/1989 | Felix | 370/94.1 |
| 4,932,020 | 6/1990 | Pashan et al. | 370/60 X |

OTHER PUBLICATIONS

Fike et al., *Understanding Telephone Electronics*, (Howard W. Sams & Co., Indianapolis; 1987; pp. 10-3 Through 10-15).

*Primary Examiner*—Bernarr E. Gregory
*Attorney, Agent, or Firm*—Val Jean F. Hillman

[57] ABSTRACT

Method and apparatus for facilitating communication of information in a system without the use of a baseband hopping unit, by sharing a common TDM bus between a plurality of radio communication units, processing units, and information links, where the processing units extract traffic channel information, packetize and/or unpacketize the information, and return same back to the common bus for retrieval by the information links or radio communication units.

27 Claims, 2 Drawing Sheets

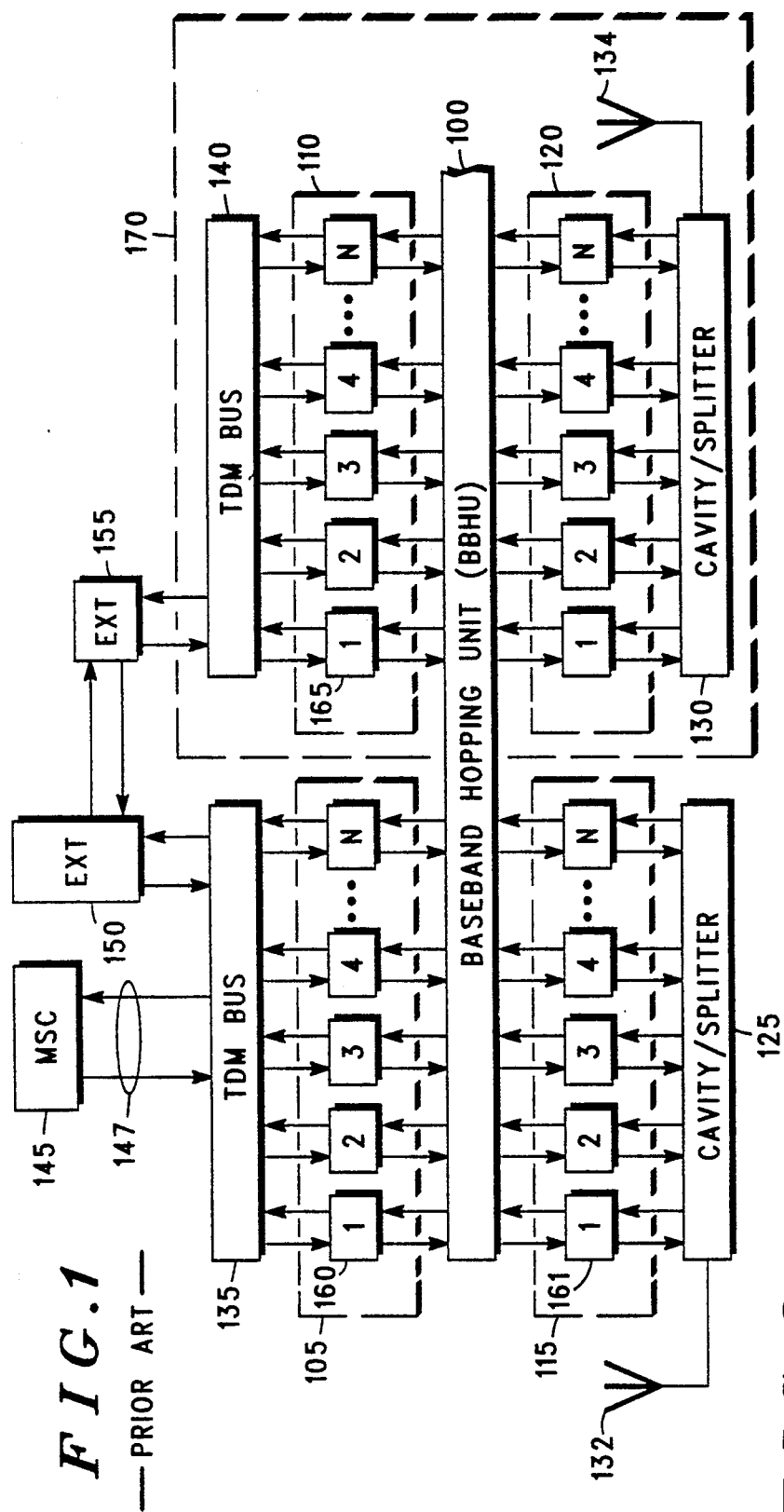
FIG.1 —PRIOR ART—
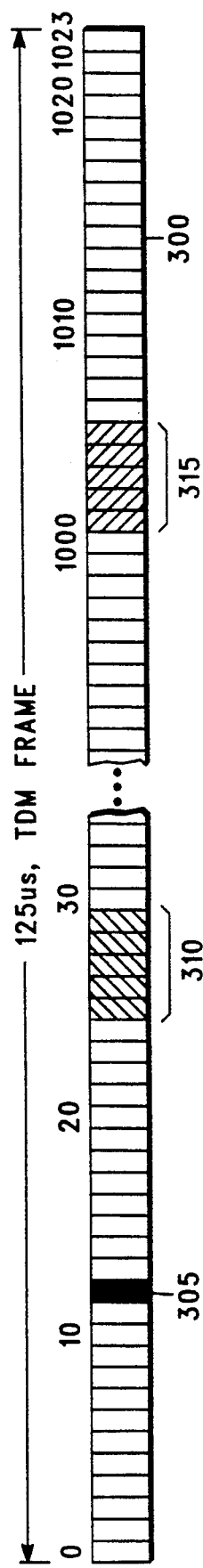
FIG.3

INTERCONNECTING AND PROCESSING SYSTEM FOR FACILITATING FREQUENCY HOPPING

TECHNICAL FIELD

This invention relates generally to radio communication systems and more particularly describes an architecture for information processing and signal interconnection to facilitate frequency hopping in cellular radiotelephone communication systems.

BACKGROUND OF THE INVENTION

Cellular radiotelephone systems use a multiplicity of radio cell sites that are connected by communication links to a central office dedicated to the mobile system called a mobile switching center (MSC). This MSC is interconnected to the local public switched telephone network (PSTN) and provides mobile subscribers access to the fixed telephone network. Mobile traffic is typically communicated between the appropriate base site and the MSC over landline links, sometimes by way of intermediate switching points. The communicated traffic is essentially the voice and/or data signals transmitted to and received from the subscribers.

Traditional cell sites comprise groups of radio transceivers to transmit and receive information to and from the subscribers. Downlink (base to mobile direction), these transceivers, under remote control of the MSC, acquire one or more traffic channels by way of the information links. These traffic channel signals are suitably processed and transmitted over a radio channel by the transceiver. In the uplink direction, information is received from a radio channel by a transceiver then processed and communicated back to the MSC.

It is well known that in conventional analog cellular systems, each transceiver (which provides a single radio channel) handles only a single traffic channel of information. For voice, the necessary downlink processing might include such processing as proper audio shaping, addition of control signals, or signal compression. In newer digital systems, such as the GSM Pan-European Digital Cellular (PEDC) system, each radio channel transceiver (also supporting a single radio channel) provides multiple traffic channels using a TDMA channel structure. In PEDC there are 8 time slots for each radio channel, each supporting one full rate traffic channel. Therefore, each transceiver extracts 8 traffic signals, wherein each signal must undergo some form of processing such as channel coding, encryption, digital speech encoding, packetization, or other suitable processing. Generally, all of the functions of the cell site transceivers are partitioned on the basis of the logical traffic channels that they serve. Uplink (mobile to base direction), the signals received from mobiles on a particular radio channel are received and appropriately decoded. This information is forwarded to the MSC via a corresponding set of communication links. However, newer cellular systems provide for capabilities that previously were not provided with earlier cellular systems. Multi-frequency cellular radiotelephone systems, such as PEDC, are using frequency hopping to improve performance of the system during interference conditions and to reduce the effects of signal fading typically caused by physical obstructions or other causes of signal impairment. Frequency hopping is provided by switching a traffic channel's information (including voice and/or data) to various transmit frequencies during a conversation. This technique is well known in spread spectrum art and is particularly useful when redundant channel coding is utilized. In essence, a traffic signal is spread over a multiplicity of frequencies, known as the hopping set. Where some of the signal may experience severe degradation or interference, the coding allows acceptable signal reconstruction using only the good information that is received.

In a system such as PEDC, multiple fixed frequency transmitters may be coupled to the same antenna by using fixed tuned cavities as understood in the art. This, however, can only be done if the transmitter frequencies feeding the tuned cavities are fixed. In these types of systems, downlink frequency hopping is achieved using multiple transmitters, each tuned to a different frequency. Fixed tuned cavities provide an efficient method of combining multiple transmitters to the same antenna to simultaneously transmit multiple frequencies without experiencing the power loss typically associated with wideband passive combiners. Typically, one transmitter is allocated to one fixed tuned cavity. Therefore, when frequency hopping is used, traffic channel information must be processed, packetized, and routed to the correct transmitters belonging to a particular frequency hopping set. Routing the proper portion of the traffic channel's information to the proper transmitters has proven troublesome.

Providing this capability at a cellular base site generally requires the addition of a baseband hopping unit (BBHU) to facilitate the frequency hopping. Baseband is herein intended to include any representation of information prior to its having been modulated onto a carrier. The BBHU may be any digital switch or router, such as an additional TDM bus switch, as understood in the art. Further detail of time division switching techniques may be found in "Digital Telephony", by John C. Bellamy, Ph.d, published by John Wiley and Sons, New York, 1982. The BBHU is hard wired between traffic channel processing units and multiple RF transceivers. This additional hardware has a direct impact on the complexity of base site layouts (size of equipment cabinets), installation, fault tolerance, cost, and overall system reliability. As base sites become increasingly complex, it becomes imperative to maintain desired functionality without substantially decreasing reliability or adding substantially to the size and cost of each base site.

FIG. 1 illustrates the use of a BBHU for facilitating downlink frequency hopping in the PEDC radiotelephone system. Five carrier frequency hopping for two independent antenna sectors (170) at a single site will be used as an example. Traffic channels for the site from the Mobile Switching Center (MSC) (145) are received over the communication links (147) and put on a TDM bus (135 and 140) using bus extender apparatus (150 and 155). A group of processing units (160 and 165) is coupled to the TDM bus and receives traffic channel information that requires packetization. This traffic information is processed and packetized by the processing units (160 and 165). The BBHU (100) must then route each packet to the appropriate transmitter (115 and 120) such that multiple packets from a given traffic channel are distributed to multiple transmitters. The distribution is such that each transmitter receives its information packet(s) at a time consistent with the radio channel's burst protocol (TDMA) specified for PEDC. As previously described, the tuned cavities (125 and 130) provide for the combining of the fixed tuned transmitters onto one antenna (132 and 134).

Current systems typically utilize multiple processing units (105 and 110) to effectuate the processing functions, which at minimum includes packetization, each of which is assigned to a specific set of traffic channels and a single transceiver (115 and 120). For example, processing unit 1(160) may be assigned to transceiver 1(161) to effectuate a pre-assigned transmit scheme for eight traffic channels when frequency hopping is not required. Frequency hopping requires that the packetized information be routed to various transmitters not necessarily dedicated to that specific processing unit performing the processing and therefore requires a BBHU.

In PEDC, each radio channel supports 8 radio TDM timeslots and therefore 8 full rate traffic channels are processed in each processing unit (160 and 165). Where 5 radio channels are used for hopping, there are 40 full rate traffic channels. For any one radio TDM time frame, each of the 40 traffic channels will have a packet transmitted over one of the 5 radio channels. Over many radio TDM time frames, each radio channel transceiver in the 5 frequency hopping set will transmit information arising from all 40 traffic channels.

For uplink baseband hopping, packets associated with a single traffic channel are received over multiple frequencies by different receivers. These multiple packets must then be routed to the appropriate processing unit through the BBHU (100) whereafter the processing unit combines and processes all of the same traffic channel's packets into a single traffic signal and communicates this processed information over the TDM bus (135 and 140) to the communication link (147) and back to the MSC (145).

For the above reasons, traditional system architecture approaches have proven inadequate to economically support certain new cellular features and capability, including frequency hopping. There exists a need to facilitate frequency hopping without the use of an additional baseband hopping unit, excess processing, or additional interconnects in order to substantially increase system reliability and reduce hardware interconnect complexity and overall system cost.

SUMMARY OF THE INVENTION

These needs and others have been substantially met by the interconnecting and processing system for facilitating frequency hopping as disclosed below. The system comprises operably coupling at least one information link, such as a link carrying at least one logical traffic channel, to a plurality of communication units, such as transmitters or receivers, through a common bus and also operably coupling at least one processing unit to the common bus whereby at least a portion of information transferred, by either the at least one information link or by multiple receivers, over the bus, is processed, such as packetized, into a processed signal. The processed signal is returned to the bus by the processing unit for later communication by at least one of the plurality of communication units or for communication over the information link. Therefore, the system uses the same bus both to route packetized information from the at least one processing unit to the plurality of communication units, and to additionally route raw unpacketized information. A processing unit in accordance with the invention, has the ability to extract information from the bus, process the information, and return it to the same bus.

One embodiment illustrates the use of multiple processing units wherein each processing unit is dedicated to one transceiver. For downlink communication, where the bus is a TDM bus, a processing unit reads unpacketized channel information from a particular time slot, packetizes the information and returns this processed signal back onto the same bus for multiple frequency transmission. Each processing unit need only extract the processed information specific for its associated transmitter and forward that information to its associated transmitter(s) for transmission at the frequency assigned to that transmitter.

Uplink, when receiving channel information from multiple receivers, the at least one processing unit extracts and processes the information by combining the multiple packets of received information into at least a single processed signal and returns the processed signal back to the bus. The processed signal is later extracted from the common bus and forwarded over information links to the MSC for interconnection with another subscriber unit or landline unit.

Processing information may additionally include such processing as channel coding, channel decoding, encryption, decryption, speech rate conversion, data rate conversion, data protocol conversion, or any other processing technique suitable to the application.

BRIEF DESCRIPTION OF THE DRAWINGS

FIG. 1 is a block diagram of a prior art system to provide frequency hopping.

FIG. 3 is a diagram illustrating one embodiment of information allocation in timeslots on a common bus in accordance with the invention.

DETAILED DESCRIPTION OF THE PREFERRED EMBODIMENT

The preferred embodiment is contemplated in the context of a cellular radiotelephone base site where information for at least one traffic channel, such as digitized speech from one conversation, is processed into multiple packets of information and communicated to multiple radio channel transmitters having fixed frequencies. The first portion of the description of this embodiment is specific to downlink (transmission from base site to subscriber unit) frequency hopping assuming that uplink frequency hopping is provided through fast receive synthesizers as known in the art. The latter portion addresses receiving traffic information over fixed frequency receivers. As appreciated by those ordinarily skilled in the art, the invention readily applies to other types of frequency hopping communication systems such as lightwave frequency hopping systems.

Figure 2:
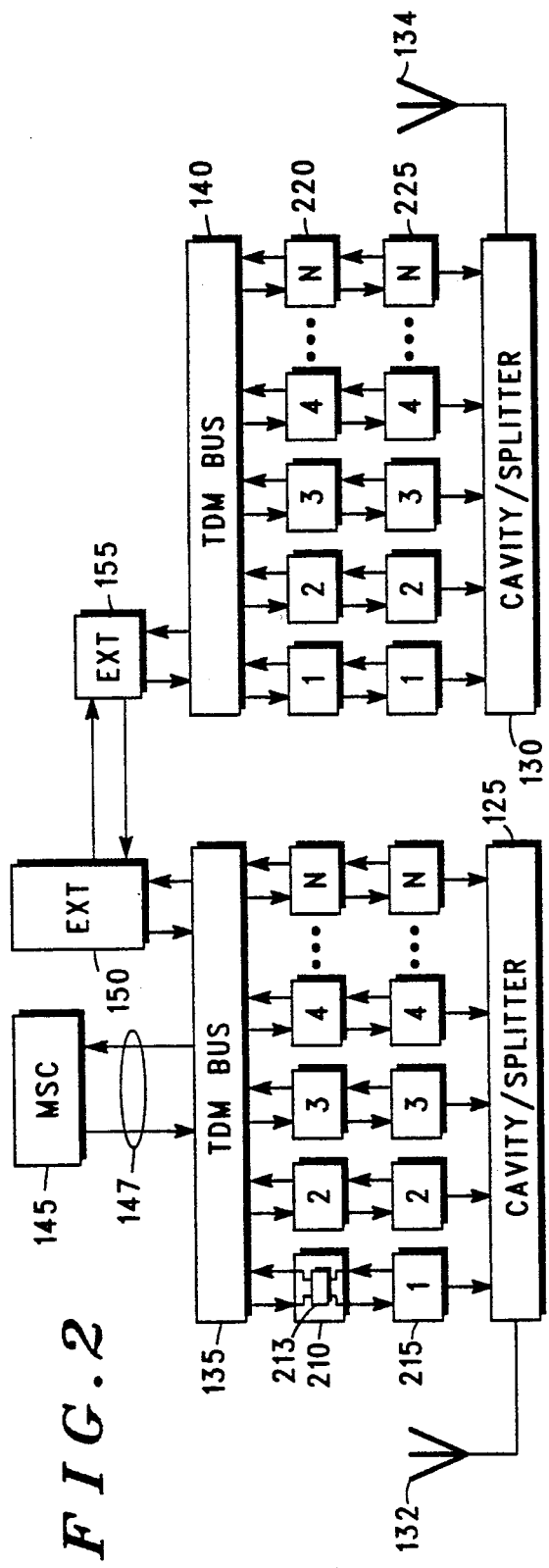
FIG. 2 is a block diagram generally depicting one embodiment of the invention.

FIG. 2 illustrates the invention employed for facilitating frequency hopping while eliminating the BBHU in a cellular base site. This system comprises an MSC (145) coupled to the information link (147), a common TDM bus (135, 150, 155, 140), processing units (210 and 220) in accordance with the invention, and fixed tuned transmitters (215 and 225) coupled to the fixed tuned cavity combiners (125 and 130) which are coupled to the antennas (132 and 134).

In the case of downlink communication, at least one logical traffic channel, comprised of speech and/or data information, is distributed over the TDM bus (135, 150, 155, 140) to the processing units (210 and 220). As appreciated by those skilled in the art, any suitable bus may also be used including combinations of serial or parallel buses with synchronous or asynchronous buses. The preferred embodiment includes a second TDM bus as a mechanism for improving the fault tolerance of the system in the case of failure of the first TDM bus. However, as understood by those skilled in the art, such redundancy may not be suitable in all applications.

The invention uses the existing bus of FIG. 1 to carry both raw information from the information link (147) to the multiple processing units (210 and 220), and packetized speech information from the processing units to the appropriate fixed tuned transmitter (215 and 225) to facilitate frequency hopping. The bus has a time-slot interchange (TSI) acting as the switch for switching information coming into the switch from the incoming bus (outgoing from the processing units and other peripherals) to the outgoing bus (incoming to the processing unit and other peripherals) as understood in the art. Other TDM bus structures may be equally applicable as appreciated by those skilled in the art.

The processing unit (210 and 220) extracts at least a portion of information for at least one traffic channel, transferred from the link (147) from its incoming TDM bus. The DSP (213) channel codes the information, interleaves it, then partitions the information from the at least one logical traffic channel into multiple packets of information as understood in the art. Once the information is processed into multiple packets, the processing unit returns this processed information back onto the same TDM bus in predetermined timeslots where the packets are made available for subsequent retrieval by at least one processing unit. Other forms of processing may be performed by the processing units (210 and 220) such as encryption, speech encoding or decoding, data rate conversion, data protocol conversion, or any other suitable information processing technique. In addition, the processing unit provides control information such as transmitter power adjustment and receiver control parameters along with the processed information.

The transmitters (215 and 225) are operably coupled to the TDM bus through the processing unit (210 and 220) to allow the processing unit to pass packetized information directly to the transmitter. The appropriate processing unit (220) extracts the processed information from the appropriate timeslots and transmits the packetized channel coded information to its dedicated transmitter. That processing unit knows which data to take based on the frequency hopping sequence it computes and knowledge of the TDM bus assignments and allocations. Retrieving this information from the same bus is accomplished by that processing unit which is associated with the particular transmitter having the desired frequency.

Consequently, the TDM bus (135 and 140), as understood in the art, provides simultaneously a path for non packetized information associated with a particular traffic channel as well as packetized information associated with a particular frequency. Unlike the processing unit and routing system associated with a BBHU, the invention transfers processed information back onto the existing TDM bus in timeslots which are later accessed by the appropriate peripherals thereby effectuating a frequency hopping scheme. This scheme eliminates the need for any additional hopping unit. Sufficient excess capacity available on the TDM bus (135 and 140) is used to facilitate routing of information to be communicated over multiple frequencies instead of through a separate BBHU.

As appreciated by those skilled in the art, many other suitable methods for extracting and returning the information from and to the common bus may be implemented. For example, the retrieving processing unit may read its necessary information from the same predetermined timeslots, predetermined but varying timeslots, or a combination of both types depending upon the nature of the system. Or, for example, the returning processing unit may return the processed information to a predetermined but varying timeslot. The facility of the existing TSI switching capability available with the TDM bus can optionally be beneficially exploited.

Uplink, multiple packets of received traffic information for one traffic channel, are communicated to the common TDM bus from a multiplicity of fixed frequency receivers. At least one processing unit extracts the multiple timeslots for one channel from the bus, combines the multiple packets for the one traffic channel into a single traffic channel and returns the single traffic channel back to the same bus for communication to the MSC. As appreciated by those skilled in the art, the processing unit may provide additional processing to the multiple packets such as channel decoding, decryption, data extraction, bit rearrangement, or any other suitable processing as may be required for the particular application.

FIG. 3 depicts one example of how information is allocated to time slots within a 125 micro second TDM frame (300) for implementation of downlink baseband hopping. One static timeslot per traffic channel (305) carries unpacketized information (raw downlink information) communicated from the information link. One particular processing unit looks for this particular timeslot within the frame and extracts this information. The information is processed such that each packet is required to be transmitted at a particular frequency. The processing unit returns this packetized information back onto the bus using a sequence of 5 timeslots (310) dedicated for this information, to allow subsequent retrieval by the appropriate processing unit associated with the desired single frequency transmitter. The appropriate processing unit may be that unit that performed the processing, or any processing unit coupled to the bus. The appropriate processing unit extracts from the TDM bus, using a predetermined algorithm, that sequence of 5 timeslots (315) that are to be transmitted at its dedicated transmitter's frequency.

Figure 4:
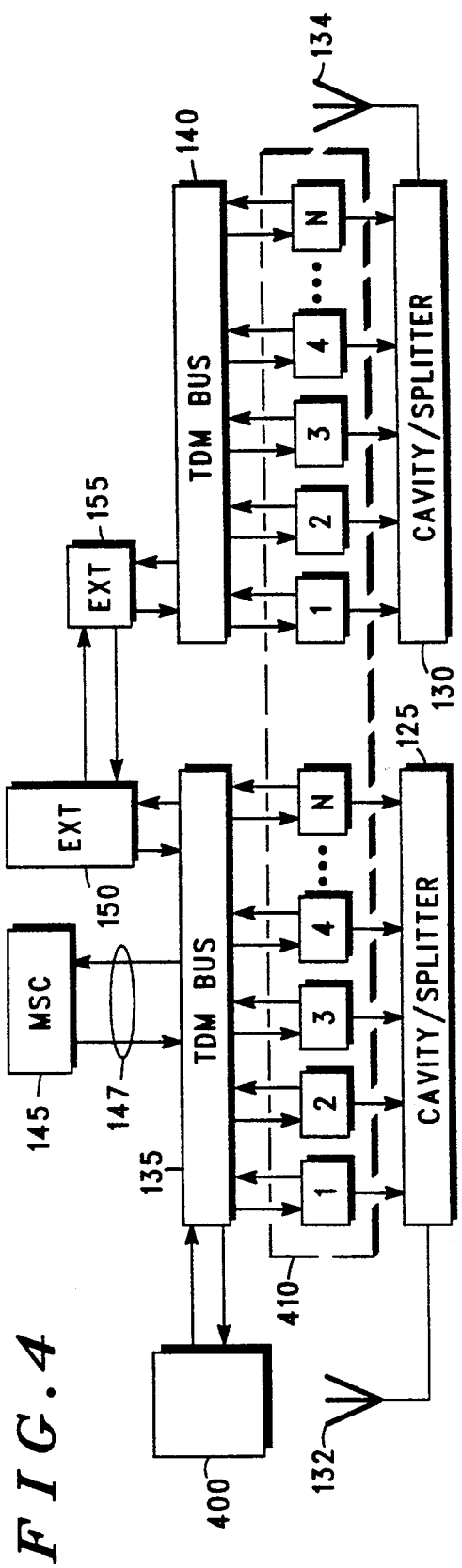
FIG. 4 is a block diagram of another embodiment using one processing device for facilitating frequency hopping in accordance with the invention.

FIG. 4 depicts a single processing unit (400) for communicating information from the information link (147) to a plurality of fixed frequency transceivers (410). As appreciated by those skilled in the art, these transceivers may be capable of communicating at any frequencies within the electromagnetic spectrum. Only one processing unit extracts unprocessed information, performs the packet processing (and other necessary processing) for all transceivers (410), and returns it to the same bus. Each respective transceiver retrieves (or deposits) the information designated to be transmitted (or received) at its associated frequency.

As appreciated by those skilled in the art, other variations of combining the processing capabilities with other stages within the above described system may be equally suitable without detracting from the scope and spirit of the invention. For example, one embodiment may include combining the processing capability with the transceiver's functions to further reduce cable interconnects between processing boards and transceivers. Also, for example, the desired signal processing for any one traffic channel may be allocated among multiple distinct processing units all communicating over the common bus. Such might be the desired scenario for providing a special capability, such as encryption, as a universal common resource.

What we claim is:

1. A method for communicating signals from at least one information link to a plurality of transmitters operating at various frequencies within a communication system, said method comprising the steps of:

operably coupling the at least one information link to the plurality of transmitters through a common communications bus;

operably coupling at least one processing unit to the common bus;

processing, in the at least one processing unit, at least a portion of the signal transferred from the at least one information link over the bus, into a processed signal;

returning the processed signal back to the bus, such that both processed and unprocessed signals are multiplexed on the common communications bus simultaneously; and extracting at least a portion of the processed signal from the bus for communication to at least one of the plurality of transmitters.

2. The method of claim 1 wherein the at least one information link carries at least one logical traffic channel.

3. The method of claim 2 wherein that logical traffic channel comprises at least one of:

speech traffic; and data traffic.

4. The method of claim 1 wherein the at least one processing unit processes traffic channel information dedicated to at least a specific logical traffic channel.

5. The method of claim 1 wherein the plurality of transmitters operably couple to the bus through the at least one processing unit.

6. The method of claim 1 wherein the step of processing further comprises at least one of the steps of:

partitioning at least a portion of a logical traffic channel into information packets to be communicated by at least one of the plurality of transmitters;

channel coding at least a portion of the unprocessed signal's information; and encrypting at least a portion of the unprocessed signal's information.

7. The method of claim 1 wherein the bus comprises a TDM bus.

8. A method for communicating signals, received by a plurality of receivers, to at least one information link within a communication system, said method comprising the steps of:

operably coupling the at least one information link to the plurality of receivers through a common communications bus;

operably coupling at least one processing unit to the common bus;

processing, in the at least one processing unit, at least a portion of the received signals transferred from the plurality of receivers over the bus, into a processed signal;

returning the processed signal back to the bus, such that both received signals and processed signals are multiplexed on the common communications bus simultaneously; and extracting at least a portion of the processed signal from the bus for communication over the at least one information link.

9. The method of claim 8 wherein the step of processing further comprises at least one of the steps of:

combining multiple information packets transferred from the receivers into a single traffic channel;

decrypting at least a portion of the received signal information transferred from the plurality of receivers; and channel decoding at least a portion of the received signal information transferred from the receivers.

10. The method of claim 8 wherein the bus comprises a TDM bus.

11. The method of claim 10 wherein the TDM bus couples multiple packets of information for at least one traffic channel from RF receivers in a cellular radiotelephone base site.

12. In a wireless communication system, a method for facilitating communication of information between at least one traffic channel and a plurality of transmitters operating at various frequencies, said method comprising the steps of:

communicating signal information for the at least one traffic channel over a common communications bus to at least one processing unit;

processing, by at least one processing unit operably coupled to the common bus, at least a portion of the signal information into multiple packets of information;

returning at least one of the multiple packets to the common bus, such that both signal information and processed signal information are multiplexed on the common communications bus simultaneously; and extracting the least one multiple packet form the bus by at least one processing unit for delivery to at least one of the plurality of transmitters for communication at a frequency associated with that transmitter.

13. The method of claim 12 wherein the bus comprises a TDM bus.

14. The method of claim 12 wherein returning at least one of the multiple packets to the common bus comprises returning channel coded information to the bus to allow an appropriate transmitter to extract the information desired to be transmitted at the frequency associated with that transmitter.

15. The method of claim 12 wherein the plurality of transmitters operably couple with a fixed frequency combiner in a cellular radiotelephone base site.

16. In a wireless communication system, a method for facilitating communication of information between at least one information link and a plurality of receivers, said method comprising the steps of:

communicating multiple packets of received signal information from the plurality of receivers over a common communications bus to at least one processing unit;

processing at least a portion of the received signal information into at least a single traffic channel;

returning that single traffic channel to the common bus, such that both packets of received signal information and that single traffic channel are multiplexed on the common communications bus simultaneously; and extracting at least a portion of the single traffic channel from the bus, for communication to the at least one information link.

17. A method for communicating baseband information from at least one processing unit to a plurality of transceivers, within a frequency hopping communication system, without the aid of baseband hopping equipment, said method comprising the steps of:

communicating baseband information over a common communications bus, processing at least a portion of the baseband information at at least a first processing unit into at least one information packet, communicating the at least one information packet back onto the bus, such that both baseband information and packetized baseband information are multiplexed on the common communications bus simultaneously, extracting the at least one information packet from the bus by at least a second processing unit; and routing the at least one information packet from the second processing unit to at least one of the plurality of transceivers, such that frequency hopping is facilitated without the aid of baseband hopping equipment.

18. The method of claim 17 wherein the bus comprises a TDM bus.

19. The method of claim 17 wherein processing comprises combining multiple packets transferred over the bus into a single traffic channel.

20. The method of claim 17 wherein the second processing unit comprises processing means for processing at least a portion of the baseband information.

21. A method for facilitating frequency hopping in a cellular radiotelephone communication system, without the aid of baseband hopping equipment, comprising the steps of:

transmitting signal information over a common communications bus, receiving the signal information at at least a first processing unit, generating a plurality of information packets at the at least first processing unit from the received signal information, communicating the plurality of information packets back onto the bus, such that both signal information and packets of signal information are multiplexed on the bus simultaneously, operably accessing the plurality of packets from the bus by a plurality of radio communication units, and communicating the plurality of information packets at the frequencies associated with the plurality of accessing radio communication units, such that frequency hopping is achieved without the aid of baseband hopping equipment.

22. The method of claim 21 wherein each packet is communicated over a TDM bus and is assigned to a predetermined radio communication unit.

23. The method of claim 21 wherein the processing unit interfaces with both an RF transmitter and the TDM bus.

24. A device for communicating signal information from at least one information link to a plurality of communication units operating at various frequencies within a communication system, said device comprised of:

means for extracting at least a portion of the signal information transferred over a communications bus common to the at least one information link and the plurality of communication units;

means, operably coupled to the means for extracting, for processing the extracted signal information into a processed signal;

means, operably coupled to means for processing, for returning the processed signal back to the bus, such that both signal information and processed signals are multiplexed on the common communications bus simultaneously; and means, coupled to the communications bus, for extracting at least a portion of the processed signal for communication to said plurality of communication units.

25. The device of claim 24 wherein the means for processing comprises:

means for partitioning the extracted signal information into multiple packets to be transmitted by the communication units at various fixed frequencies; and means for combining the multiple packets into at least a single logical traffic channel.

26. The device of claim 24 wherein the means for processing is further comprised of at least one of:

encrypting means for encrypting signal information;

decrypting means for decrypting received signal information;

channel coding means for coding processed signals; and channel decoding means for decoding processed signals.

27. The device of claim 24 wherein the plurality of communication units are selected from the group of devices consisting of:

transmitters,
receivers, and
transceivers.

* * * * *